UNITED STATES PATENT OFFICE.

AUGUST LEOPOLD LASKA, OF OFFENBACH-ON-THE-MAIN, GERMANY, ASSIGNOR TO CORPORATION CHEMISCHE FABRIK GRIESHEIM-ELEKTRON, OF FRANKFORT-ON-THE-MAIN, GERMANY.

BLUISH-RED DISAZO DYE.

964,918. Specification of Letters Patent. Patented July 19, 1910.

No Drawing. Application filed April 13, 1910. Serial No. 555,283.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hesse, Germany, with the post-office address Gerberstrasse 5, have invented new and useful Improvements in Bluish-Red Disazo Dyestuffs, of which the following is a specification.

My invention relates to the production of disazo dyestuffs, which may be used advantageously for the preparation of color lakes.

The process consists in combining the tetrazo compounds of dichlorodiaminodiphenolalkylethers having the formula:

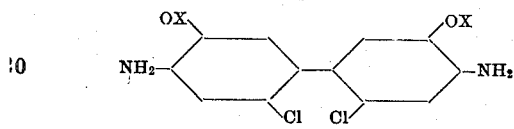

wherein X means an alkyl group, with two molecules beta-naphthol. The thus obtained disazo dyestuffs can be transformed in bluish-red color lakes being very fast against light and insoluble in water and oil. Among alkylethers of the dichlorodiaminodiphenol may be used for instance dichlorodianisidin and dichlorodiphenetidin. The transformation of the dyestuffs in pigment colors can be performed in the usual manner. Of course the combination of the tetrazo compounds with beta-naphthol can be made also in presence of a substratum.

Example: 15.6 parts of dichlorodianisidin are diazotized by means of 6.9 parts of sodium nitrite and the necessary quantity of hydrochloric acid. The resulting solution, which if necessary may be filtered, is introduced into an ice cold solution of 16 parts of beta-naphthol in 14 parts of caustic soda lye (35° Bé.) and 250 parts of water containing 6 parts of soda. The entirely precipitated dyestuff is filtered off, washed and advantageously used in pasty form. An addition of Turkey red oil or a similar acting ingredient, for instance soap, to the solution of beta-naphthol is recommendable. The dyestuff forms in dry state a dark-red powder, insoluble in water, soluble in concentrated sulfuric acid with blue color. By reduction with stannous chlorid and hydrochloric acid the dyestuff is split in dichlorodianisidin and aminonaphthol.

Now what I claim and desire to secure by Letters Patent is the following:

1. The process for the production of disazo dyestuffs, consisting in combining the tetrazo compounds of dichlorodiaminodiphenolalkylethers of the aforesaid constitution with two molecules of beta-naphthol.

2. As new articles the disazo dyestuffs obtained by combination of tetrazo compounds of dichlorodiaminodiphenolalkylethers of the aforesaid constitution with two molecules of beta-naphthol, which dyestuffs form in dry state dark-red powders, insoluble in water, soluble in concentrated sulfuric acid with blue color, and which by reduction with stannous chlorid and hydrochloric acid are split in dichlorodiaminodiphenolalkylethers and aminonaphthol.

3. The process for the production of a disazo dyestuff, consisting in combining the tetrazo compound of dichlorodianisidin with two molecules of beta-naphthol.

4. As a new article the dyestuff obtained by combination of the tetrazo-compound of dichlorodianisidin having the aforesaid constitution with two molecules of beta-naphthol, which dyestuff forms in dry state a dark-red powder, insoluble in water, soluble in concentrated sulfuric acid with blue, and splitting by reduction with stannous chlorid and hydrochloric acid in dichlorodianisidin and aminonaphthol.

In testimony, that I claim the foregoing as my invention, I have signed my name in presence of two witnesses, this second day of April 1910.

AUGUST LEOPOLD LASKA.

Witnesses:
  HERMANN WERT,
  KATHINKA PFEIFFER.